T. H. Burley,
Dovetailing Machine.
N° 12,122.  Patented Jan. 2, 1855.
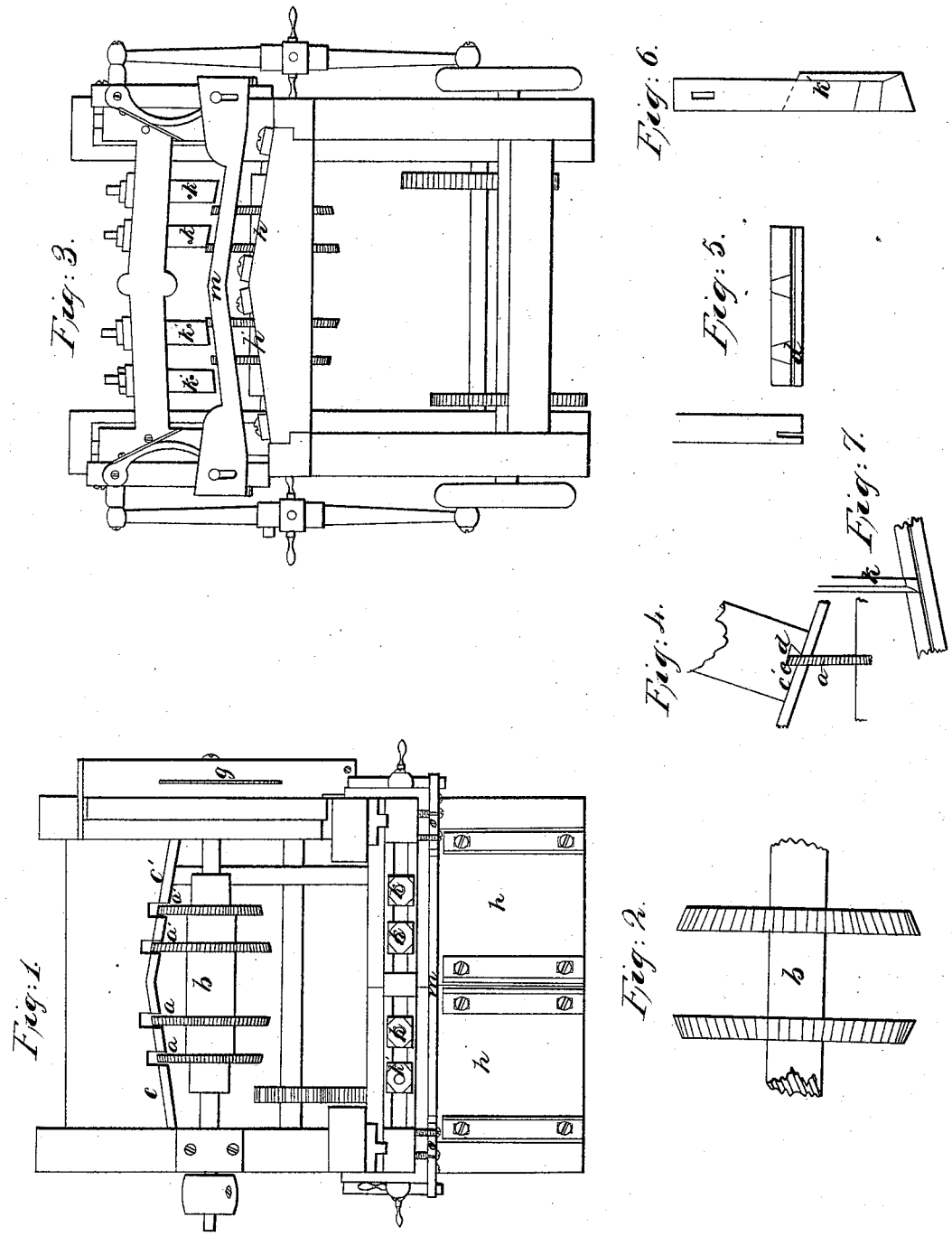

UNITED STATES PATENT OFFICE.

THOMAS H. BURLEY, OF CINCINNATI, OHIO.

DOVETAILING-MACHINE.

Specification of Letters Patent No. 12,122, dated January 2, 1855.

*To all whom it may concern:*

Be it known that I, THOS. H. BURLEY, of Cincinnati, in the county of Hamilton and State of Ohio, have invented an Improvement in Dovetailing-Machines, and that the following is a full, clear, and exact description of the principle or character which distinguishes it from all other things before known and of the usual manner of making, modifying, and using the same, reference being had to the accompanying drawings, of which—

Figure 1 is a top view of the machine; Fig. 2, a detached view of the saws showing the inclined edges of the teeth. Fig. 3 is an end elevation showing the chisels. Fig. 4 is a detached view showing the operation of the saws $a$, $a'$. Fig. 5 shows the piece of wood before and after it is cut by the chisels. Fig. 6, is an enlarged view of the chisel. Fig. 7, shows the operation of the chisel cutting the piece of wood.

My invention consists in giving obliquity to the cutting edges of the saws in combination with inclined fronting guides or tables on which the pieces to be mortised are to be brought up to the saws, and in arranging the series of chisels with inclined cutting edges over a double inclined cutting bed or table for the purpose of dovetailing with facility and despatch.

The inclined edges of the saw teeth are shown at $a$, $a'$ there being two sets of saws on the same shaft $b$ with their edges reversed as shown in Figs. 1 and 2. There is a gage table with two inclined fronting guides $c$ $c'$ corresponding to the two sets of saws $a$, $a'$ so that when the piece to be mortised is laid on the gage table and with it brought up parallel to the edges of the saws $a$ they will cut obliquely into the piece as shown at $d$ Figs. 4 and 5 and also cut a straight edge $e$ on the bottom of the mortise; then by passing the piece of wood to the guide $c'$ the saws at $a'$ cut obliquely on the other side of the mortise and thus complete it. The tennoning is performed as follows: The piece is slit to the required depth by the saw $g$ as shown in Fig. 5. It is then carried to the inclined table $h$ and passed under the set of chisels $k$ and is held fast by the bar or held fast ($m$) or in any of the ways common to mortising machines. The chisels have two cutting edges at right angles to each other as shown at Fig. 6, and they are inclined so as to be parallel to the inclination of the table $h$. The chisels being brought down cut one side of the tenon or mortise (which ever it may be called) as shown in Fig. 7. The piece is now carried to the inclined table $h'$ on the other side and the reverse of table $h$ and the operation repeated to complete the mortise; the sides and cutting edges of the set of chisels $k'$ being the reverse of the set $k$ to suit the operation.

I claim—

1. The inclined fronting guide in combination with the oblique cutting edges of the saw teeth in the manner and for the purposes set forth.

2. I claim the double inclined tables in combination with the series of vertical chisels, in the manner and for the purposes set forth.

THOMAS H. BURLEY.

Witnesses:
R. J. CAMPBELL,
GEO. H. SIEBEL.